United States Patent
Falk et al.

(10) Patent No.: US 9,071,028 B2
(45) Date of Patent: Jun. 30, 2015

(54) ELECTRICAL CONNECTION BETWEEN TWO BUSBARS MADE OF FLAT CONDUCTORS AND OF AN INSULATING LAYER DISPOSED BETWEEN THE CONDUCTORS

(71) Applicant: SMA Solar Technology AG, Niestetal (DE)

(72) Inventors: Andreas Falk, Kassel (DE); Philipp Werb, Niestetal (DE)

(73) Assignee: SMA Solar Technology AG, Niestetal (DE)

( * ) Notice: Subject to any disclaimer, the term of this patent is extended or adjusted under 35 U.S.C. 154(b) by 141 days.

(21) Appl. No.: 13/875,678

(22) Filed: May 2, 2013

(65) Prior Publication Data
US 2013/0244458 A1    Sep. 19, 2013

Related U.S. Application Data

(63) Continuation of application No. PCT/EP2011/067997, filed on Oct. 14, 2011.

(30) Foreign Application Priority Data

Nov. 2, 2010  (DE) ............... 20 2010 008 933 U
Feb. 24, 2011 (DE) ............... 20 2011 000 434 U

(51) Int. Cl.
H01R 4/44      (2006.01)
H01R 25/16     (2006.01)
H01G 4/228     (2006.01)

(52) U.S. Cl.
CPC ............ H01R 25/162 (2013.01); H01G 4/228 (2013.01); H01R 4/44 (2013.01)

(58) Field of Classification Search
CPC .............................. H02G 5/007; H01R 25/162
USPC ......... 439/210, 212, 213, 214, 781; 174/88 B
See application file for complete search history.

(56) References Cited

U.S. PATENT DOCUMENTS 2,274,422 A * 2/1942 Mahoney et al. ............ 174/73.1
2,932,686 A * 4/1960 Herrmann ................... 174/88 R
(Continued)

FOREIGN PATENT DOCUMENTS

EP    1885025 A2    2/2008

OTHER PUBLICATIONS

International Search Report dated Dec. 16, 2011 for International Application No. PCT/EP2011/067997. 2 Pages.

(Continued)

Primary Examiner — Ross Gushi
(74) Attorney, Agent, or Firm — Eschweiler & Associates, LLC

(57) ABSTRACT

The disclosure relates to an electrical connection between two busbars made of flat conductors and an insulating layer disposed between the conductors at the opposite longitudinal edges of the two busbars. The two conductors of each busbar run parallel to each other at a distance on the longitudinal edge thereof, wherein a molded part made of electrically insulating material bridges the distances between the conductors of the two busbars. Electrically conductive contact elements, forced against each other but electrically insulated from each other, each contact one of the conductors of each busbar by means of structured contact surfaces and clamp the same between the element and the molded part, wherein the contact surfaces for the conductors of the two busbars including clamping protrusions running parallel to the longitudinal edges.

20 Claims, 4 Drawing Sheets

(56) References Cited

U.S. PATENT DOCUMENTS

| | | | |
|---|---|---|---|
| 3,180,924 A * | 4/1965 | Rowe | 174/88 B |
| 3,339,009 A * | 8/1967 | Davis et al. | 174/72 B |
| 3,346,687 A * | 10/1967 | Giger, Jr. et al. | 174/68.2 |
| RE26,310 E * | 11/1967 | Moodie | 174/68.2 |
| 3,365,537 A * | 1/1968 | Fehr, Jr. et al. | 174/88 B |
| 3,408,454 A * | 10/1968 | Fouse | 174/71 B |
| 3,462,541 A * | 8/1969 | Wescott et al. | 174/88 B |
| 3,559,148 A * | 1/1971 | Hafer | 439/213 |
| 3,710,300 A * | 1/1973 | Koenig et al. | 439/114 |
| 3,733,575 A | 5/1973 | Gottschalk et al. | |
| 3,786,394 A * | 1/1974 | Koenig et al. | 439/213 |
| 3,818,417 A * | 6/1974 | Koenig et al. | 439/213 |
| 3,820,057 A * | 6/1974 | Joly | 439/213 |
| 3,845,451 A * | 10/1974 | Neidecker | 439/295 |
| 3,861,595 A * | 1/1975 | Deal | 439/436 |
| 3,895,853 A * | 7/1975 | Neidecker | 439/810 |
| 3,909,098 A * | 9/1975 | Reed et al. | 439/213 |
| 3,956,574 A * | 5/1976 | Weimer | 174/68.2 |
| 4,009,920 A * | 3/1977 | Hicks et al. | 439/213 |
| 4,174,143 A * | 11/1979 | Hicks et al. | 439/213 |
| 4,272,646 A * | 6/1981 | Carlson | 174/88 B |
| 4,293,176 A * | 10/1981 | Lindlof | 439/413 |
| 4,462,657 A * | 7/1984 | Snowdon et al. | 439/840 |
| 4,627,680 A * | 12/1986 | Weimer et al. | 439/210 |
| 4,728,752 A * | 3/1988 | Hicks et al. | 174/88 R |
| 4,842,533 A * | 6/1989 | Beberman et al. | 439/213 |
| 4,849,581 A * | 7/1989 | Larkin et al. | 174/88 B |
| 4,886,940 A * | 12/1989 | Gagnon et al. | 174/88 B |
| 4,950,841 A * | 8/1990 | Walker et al. | 174/88 B |
| 4,979,906 A * | 12/1990 | Shrout et al. | 439/213 |
| 4,981,449 A * | 1/1991 | Buchter | 439/724 |
| 4,983,132 A * | 1/1991 | Weidler | 439/786 |
| 5,122,072 A * | 6/1992 | Arn et al. | 439/210 |
| 5,196,987 A * | 3/1993 | Webber et al. | 361/624 |
| 5,206,461 A * | 4/1993 | Genzel et al. | 174/88 B |
| 5,261,830 A * | 11/1993 | Jego et al. | 439/210 |
| 5,442,135 A * | 8/1995 | Faulkner et al. | 174/68.2 |
| 5,760,339 A * | 6/1998 | Faulkner et al. | 174/88 B |
| 5,854,445 A * | 12/1998 | Graham et al. | 174/99 B |
| 6,146,169 A * | 11/2000 | Calder et al. | 439/213 |
| 6,329,598 B1 * | 12/2001 | M'Sadoques et al. | 174/68.2 |
| 6,521,837 B2 * | 2/2003 | Hilgert et al. | 174/99 B |
| 7,667,952 B2 * | 2/2010 | Allain et al. | 361/502 |
| 7,678,995 B2 * | 3/2010 | Hengel et al. | 174/88 B |
| 7,704,083 B1 * | 4/2010 | Cheyne et al. | 439/115 |
| 7,819,681 B1 * | 10/2010 | Rodrigues et al. | 439/213 |
| 7,862,356 B1 * | 1/2011 | O'Leary et al. | 439/213 |
| 8,033,850 B2 * | 10/2011 | O'Leary et al. | 439/213 |
| 8,177,569 B1 * | 5/2012 | Dozier et al. | 439/213 |
| 8,258,404 B2 * | 9/2012 | Latimer | 174/149 B |
| 8,378,219 B2 * | 2/2013 | Lesieur et al. | 174/129 B |
| 8,550,830 B1 * | 10/2013 | Bhathija et al. | 439/213 |
| 8,576,082 B2 * | 11/2013 | Jones | 340/584 |
| 8,711,549 B2 * | 4/2014 | Rodrigues et al. | 361/675 |
| 8,847,088 B2 * | 9/2014 | Bhathija et al. | 200/293 |
| 8,864,510 B2 * | 10/2014 | Walgenbach et al. | 439/213 |
| 2005/0233625 A1 * | 10/2005 | Faulkner | 439/210 |
| 2008/0002328 A1 * | 1/2008 | Allain et al. | 361/306.1 |
| 2010/0012375 A1 * | 1/2010 | Jur et al. | 174/88 B |
| 2011/0132635 A1 * | 6/2011 | Lesieur et al. | 174/68.2 |
| 2011/0136362 A1 * | 6/2011 | O'Leary et al. | 439/213 |
| 2013/0171850 A1 * | 7/2013 | Mooney et al. | 439/213 |
| 2013/0244458 A1 * | 9/2013 | Falk et al. | 439/115 |
| 2014/0120755 A1 * | 5/2014 | Walgenbach et al. | 439/213 |
| 2014/0141636 A1 * | 5/2014 | O'Leary et al. | 439/213 |

OTHER PUBLICATIONS

International Preliminary Report on Patentability dated May 16, 2013 for International Application No. PCT/EP2011/067997. 8 Pages.

* cited by examiner

ELECTRICAL CONNECTION BETWEEN TWO BUSBARS MADE OF FLAT CONDUCTORS AND OF AN INSULATING LAYER DISPOSED BETWEEN THE CONDUCTORS

REFERENCE TO RELATED APPLICATIONS

The present disclosure is a continuation of International Patent Application PCT/EP2011/067997, entitled, "Electrical Connection Between Two Busbars Made of Flat Conductors and an Insulating Layer Disposed Between the Conductors", filed on Oct. 14, 2011, which claims priority to German Utility Model Applications DE 20 2010 008 933.6, entitled, "Elektrische Verbindung zwischen zwei Busbars aus ebenen Leitern und einer zwischen den Leitern angeordneten Isolationsschicht," filed on Nov. 2, 2010, and DE 20 2011 000 434.1, also entitled, "Elektrische Verbindung zwischen zwei Busbars aus ebenen Leitern und einer zwischen den Leitern angeordneten Isolationsschicht," filed on Feb. 24, 2011.

FIELD

The present disclosure relates to an electrical connection between two busbars made of flat conductors and of an insulating layer disposed between the conductors, the electrical connection being provided at parallel longitudinal edges of the two busbars.

BACKGROUND

US 2008/002328 A1 discloses an electrical connection between protuberances of two busbars. The protuberances are provided at parallel longitudinal edges of the busbars and each include the two conductors and the insulation layer of the respective busbar. In the area of each of these protuberances, one of the two conductors is twice bent by 90° and thus offset away from the other conductor. As a results, the two conductors are parallel at a free distance with regard to each other at the free end of each protuberance. A shaped body of electrically insulating material is arranged between the two conductors in the area of both protuberances. Electrically conductive contact elements made as metal plates are arranged on those sides of the conductors facing away from the shaped body. Two threaded rods are fixed to one of the two metal plates which extend through holes in the shaped body and in the other metal plate. In the area of the other metal plate, the threaded rods are enclosed by insulating bushings. These insulating bushings are supported at that side of the other metal plate facing away from the shaped body via a radial flange and serve as abutments for nuts threaded onto the threaded bars. By means of these nuts, the two metal plates are forced together without providing an electrical contact between them. The surfaces of the metal plates facing the conductors may be structured by means of small grooves running perpendicular to the longitudinal edges to enhance the electric contact between the metal plates and the conductors.

When the electrical connection known from US 2008/002328 A1 has to conduct high currents flowing from one busbar to the other in operation of capacitor banks, like for example as buffer capacitances in an inverter feeding electric energy from a photovoltaic generator into an AC power grid, it quickly reaches higher temperatures. At these higher temperatures, the force applied between the conductive contact elements by means of the nuts may get lost due to the lower temperature stability of the insulating bushings made of plastic. As a result, the two-dimensional electric contact between the contact elements and the conductors contacted by them may get lost. This particularly applies if the longitudinal edges of the two busbars and/or the two conductors of each busbar are not exactly parallel and may thus only be forced into a sufficient two-dimensional electric contact with the metal plates by a considerable force. For this reason, complicated contact mediating elements have to be arranged between the contact elements and the conductors, like they are for example known from EP 0 716 474 A1, to permanently ensure the desired electric contacts. These contact mediating elements are also used, for example, to make forked plugs for a pluggable connection of current rails in current converters in rail vehicles, and they consist of elastically deformable structures made of sheet metal. With very high currents to be conducted, these contact mediating elements quickly reach their physical limits and overheat due to their comparatively small conductive sheet cross sections.

There still is a need for an electrical connection between two busbars made of flat conductors and of an insulating layer arranged between the two conductors at parallel longitudinal edges of the two busbars which provides for an improved electrical contact between the two busbars, particularly with regard to its thermal stability.

SUMMARY

The present disclosure provides an electrical connection between two busbars, each busbar being made of two flat conductors and of an insulating layer disposed between the conductors. Each busbar has a longitudinal edge, wherein the longitudinal edges of both busbars are arranged opposite to each other, and the two conductors of each busbar run parallel to each other at a distance along the longitudinal edge of the respective busbar. The electrical connection comprises a shaped body made of electrically insulating material bridging the distances between the two conductors of both busbars, and two electrically conductive contact elements forced against each other but electrically insulated from each other. The shaped body and the conductors of both busbars on both sides of the shaped body are arranged between the two contact elements. Each contact element contacts one conductor of each busbar via a structured contact surface and clamps the conductor against the shaped body. The contact surfaces of the contact elements for each conductor of the two busbars comprise a clamping web extending parallel to the longitudinal edges and having a flat cross section.

Other features and advantages of the present disclosure will become apparent to one with skill in the art upon examination of the following drawings and the detailed description. It is intended that all such additional features and advantages be included herein within the scope of the present disclosure, as defined by the claims.

BRIEF DESCRIPTION OF THE DRAWINGS

The disclosure can be better understood with reference to the following drawings. The components in the drawings are not necessarily to scale, emphasis instead being placed upon clearly illustrating the principles of the present disclosure. In the drawings, like reference numerals designate corresponding parts throughout the several views.

DETAILED DESCRIPTION

Figure 1:
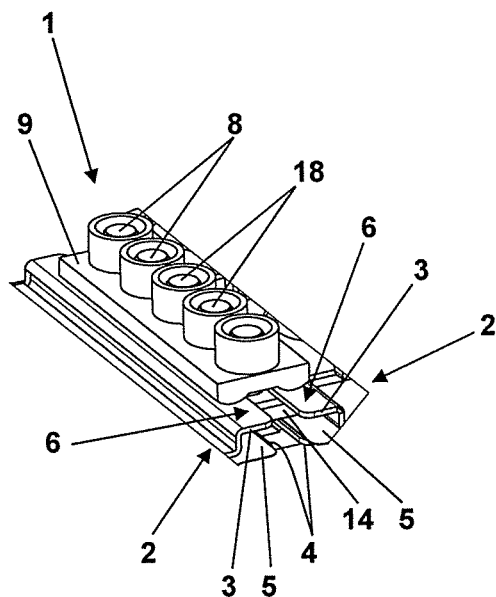
FIG. 1 is a perspective view at a slant angle from above onto a first embodiment of the electrical connection between two busbars.

A busbar made of flat conductors and of an insulating layer disposed between the conductors may, for example, be used to connect a plurality of capacitors in parallel, i.e. for forming a so-called capacitor bank. If a plurality of such capacitor banks is to be connected in parallel, the respective busbars are to be connected electrically. Here, it is important that their electrical connection is made in such a way that as little parasitic inductance result as possible.

In the new electrical connection, a defined strip-shaped contact area of each conductor with the associated contact element is ensured in that a clamping web of a shallow cross section and running parallelly to the longitudinal edges of the busbars is formed at the contact elements for each of the conductors. In one embodiment each contact surface for each of the conductors only forms a single one of such clamping webs over its entire width, i.e. that each entire contact surface, in a cross section perpendicular to the course of the longitudinal edges, is convex or trapezoid. Due to the clamping web, the desired strip-shaped electrical contact along the longitudinal edges between the contact surfaces and the conductors of both busbars is achieved in the new electrical connection even if the conductors of both busbars are not exactly arranged parallel to one another within the same planes but are, for example, arranged at a small offset or at a small mismatch angle, which may not be avoided in a low tolerance manufacture. Further, no particularly high clamping forces between the two contact elements of the electrical connection are required for ensuring the strip-shaped contact area even with such orientation mismatches.

Typical radiuses of curvature of the cross section of the contact surface are in a range beginning at about 0.5 times of the width and ending at about 5 times the width of the respective contact surface perpendicular to the longitudinal edges. In one embodiment, the radius of curvature is in a range from 1 time to 2 times the width of the contact surface perpendicular to the longitudinal edges.

In the new electrical connection according to one embodiment, the contact elements are forced against each other by a plurality of clamping elements distributed along the longitudinal edges. In one embodiment, at least three clamping elements, particularly five clamping elements, are uniformly distributed along the longitudinal edges.

Each clamping element may comprise a clamping screw which, through a hole in the one contact element, engages a threaded hole in the other contact element, and which, via its head, is supported at the one contact element. If the clamping screw is not made of an electrically insulating material, it has to be electrically isolated with regard to the one contact element. This may, for example, be realized in that a bushing made of electrically insulating material is disposed between the clamping screw and the one contact element, and in that the head of the clamping screw is supported at the one contact element via a radial flange of the bushing. The bushing may extend up into a hole in the shaped body.

Each threaded hole in the other contact element may be provided by a separate threaded bushing pressed into the other contact element. This threaded bushing may be a low cost standard part.

In one embodiment of the electrical connection, each bushing is made of a material which, even with increasing temperature, supports the forces applied between the contact elements by means of the clamping elements. For this purpose, bushings for example made of a plastic material, like particularly a thermoset material, or of a ceramic material, are suited. A plastic material is worked more easily and is less brittle, whereas a ceramic material is dimensionally stable at even higher temperatures.

The shaped body may also be made of a plastic material, like, for example, a thermoset material, or of a ceramic material. Often it will be made of a temperature stable plastic material without losses in function even if the bushings due to the high temperatures occurring are already made of a ceramic material, because the shaped body supports the forces between the two contact elements, which are also acting upon him, over a larger surface area.

In the electrical connection, one ore both insulating layers of the two busbars disposed between the conductors of the respective busbar may extend up to between one of the conductors of the respective busbar and the shaped body. Thus, an electrical insulation provided by the insulating layer changes over to the electrical insulation provided by the shaped body without interruption.

In one embodiment the shaped body may comprise convex supporting surfaces for the conductors of the busbars to increase the capability of bridging misalignments between the longitudinal edges of the two busbars. The convex supporting surfaces may be mirror symmetric with regard to the contact surfaces of the contact elements facing them across the respective conductor and may thus have same radiuses of curvature.

In one embodiment of the new electrical connection, the contact surfaces for each conductor of the two busbars are provided with grooves running parallel to the longitudinal edges, which structure the contact surfaces with triangular or sawtooth structures. In the new electrical connection, these structures are provided in addition to the structure of the contact surfaces by means of the clamping webs, and these structures are much finer than the structures provided by means of the clamping webs. This means that the contact surfaces, in the area of each clamping web, are provided with a plurality or multitude of grooves. In these additional structures of the contact surfaces, the formation of the grooves in the contact surfaces is less important than the areas of the contact elements remaining between the grooves which protrude perpendicular to the longitudinal edges in the form of triangles or saw teeth and which are impressed with their tips into the surfaces of the conductors of the busbars. Any oxide layers at the surfaces of the conductors which stand against a direct electrical contact are broken up in this way and need not to be laboriously removed prior to mounting the contact elements.

The grooves in the contact surfaces comprise typical widths and depths in a range of 0.1 mm to 1 mm, for example, in a range of 0.1 mm to 0.5 mm. The areas of the contact elements remaining between the grooves and having a triangular-shaped or sawtooth-shaped profile have similar dimensions.

In one embodiment of the electrical connection, the contact elements have a higher surface hardness at the contact surfaces than the conductors of the busbar so that the areas of the contact elements remaining between the grooves can be pressed into the surface of the conductors and are not essentially deformed upon applying the contact force.

If the conductors of the busbars are, for example, made of aluminum, the contact elements may be made of a harder aluminum alloy which, for example, comprises an addition of zinc for alloy hardening. Such an alloy-hardened aluminum may still be processed by rod extrusion for manufacturing raw material for the contact elements at low cost. The grooves in the contact surfaces of the contact elements may be directly formed by the step of rod extrusion.

Figure 2:
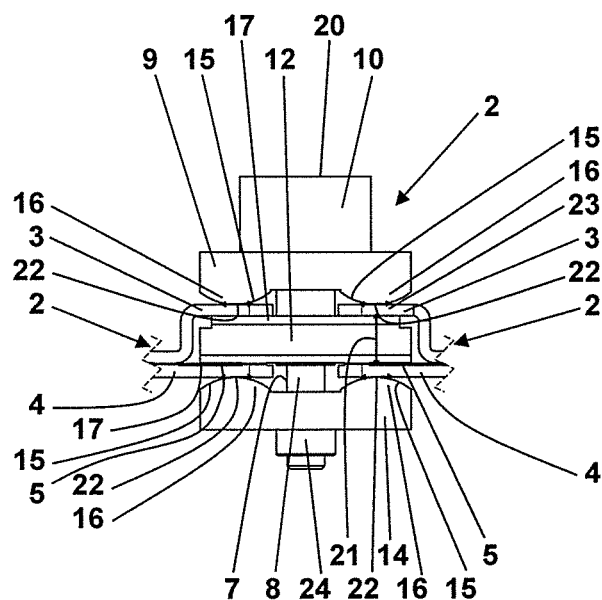
FIG. 2 is a view of the electrical connection according to FIG. 1 with a viewing direction along the longitudinal edges of the two busbars.

Now referring in greater detail to the drawings, FIGS. 1 and 2 depict an electrical connection 1 between two busbars 2 made of flat conductors 3 and 4 and of an insulating layer 5 disposed between the conductors 3 and 4. The electrical connection 1 is provided at opposing longitudinal edges 6 of the two busbars 2. A rim 23 of the upper conductor 3 of each busbar 2 is offset away from the lower conductor 4 so that the two conductors 3, 4 of each busbar 2 run parallel to one another at its longitudinal edge 6 at a distance 21. The conductors 3 and the conductors 4 of both busbars corresponding to each other are each electrically contacted with each other by means of a contact element 9 or 14, respectively. Clamping elements 7 in the form of clamping screws 8 are provided, which—in the area of the upper contact element 9—are enclosed by electrically insulating bushings 10 and which extend through holes in the upper contact element 9 and a shaped body 12 made of insulating material and disposed between the conductors 3 and 4 up into threaded holes 13. The threaded holes 13 are provided in threaded bushings 24 pressed into holes in the lower contact element 14 from below. The shaped body 12 is disposed between the conductors 3 and 4 and bridges the distance 21 between the rim 23 of the conductor 3 and the conductor 4 disposed beneath. The insulating layer 5 protrudes up to between the shaped body 12 and the lower conductor 4. Contact surfaces 15 of the contact elements 9 and 14, which each abut against one of the conductors 3 and 4, are convex. They thus form shallow rounded clamping webs 16 which press the conductors 3 and 4 against supporting surfaces 17 of the shaped body 12. The supporting surfaces 17 are plane-parallel here. Alternatively, they are also convex with a, for example, mirror-symmetric course with regard to the facing contact surfaces 15. The shallow clamping webs 16 abut against the conductors 3 and 4 via stripe-shaped areas 22 running along the longitudinal edges 6 and provide for a permanent electrical contact with a sufficiently large two-dimensional extension between the conductors 3 and 4, respectively, of both busbars 2.

Figure 3:
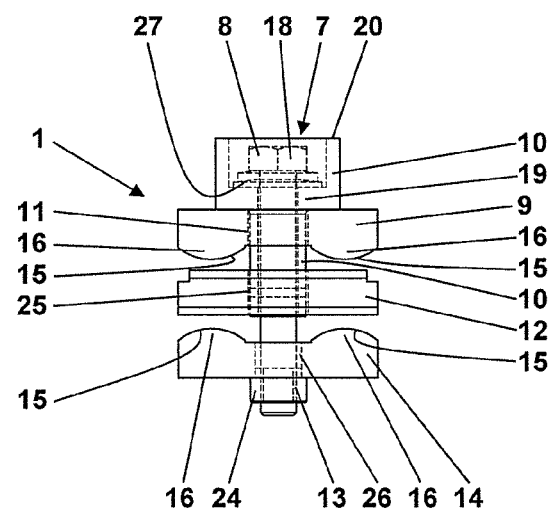
FIG. 3 is a view of the electrical connection according to FIGS. 1 and 2 with a viewing direction according to FIG. 2, wherein the two busbars themselves are omitted and wherein not directly visible lines of the connection elements are depicted.

From FIG. 3 it may be seen that the bushings 10 extend through the entire shaped body 12. The bushings 10 and the shaped body 12 may be made of thermoset materials in one embodiment. The electrical connection displays a particularly high thermal stability if at least the bushings 10 are made of a ceramic material. FIG. 3 further indicates that heads 18 of the clamping screws 8 each abut against the upper side of the contact element 9 via a washer 27 and via a radial flange 19 which is a part of the bushing 10, and that the upper rims 20 of the bushings 10 extends upwardly above the heads 18 to avoid electrical flashovers between the heads 18 and the contact element 9.

Figure 4:
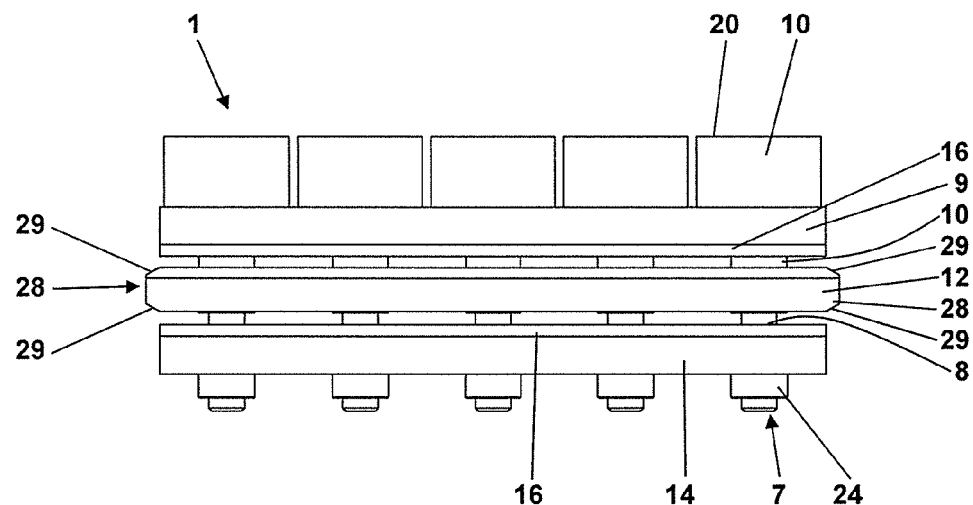
FIG. 4 is a view of the electrical connection according to FIGS. 1 to 3 with a viewing direction perpendicular to FIGS. 2 and 3, wherein the two busbars are also omitted here.

FIG. 4 additionally indicates that the shaped body is provided with chamfers 29 at both ends 28 allowing for more easily pushing the shaped body between the conductors 3 and 4 at the longitudinal edges of the busbars according to FIGS. 1 and 2.

Figure 5:
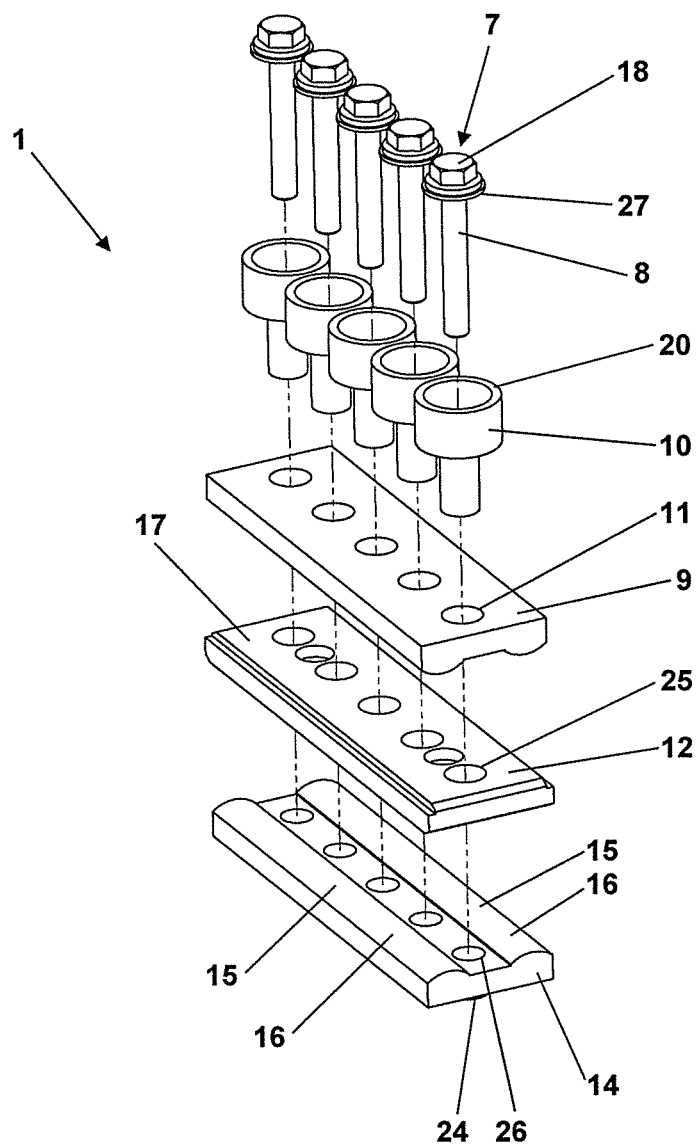
FIG. 5 is a perspective exploded view of the electrical connection according to FIGS. 1 to 4 without depiction of the two busbars.

FIG. 5 shows the individual parts of the connection 1, wherein the threaded bushings 24 pressed into the lower contact element 14 are not separately depicted.

Figure 6:
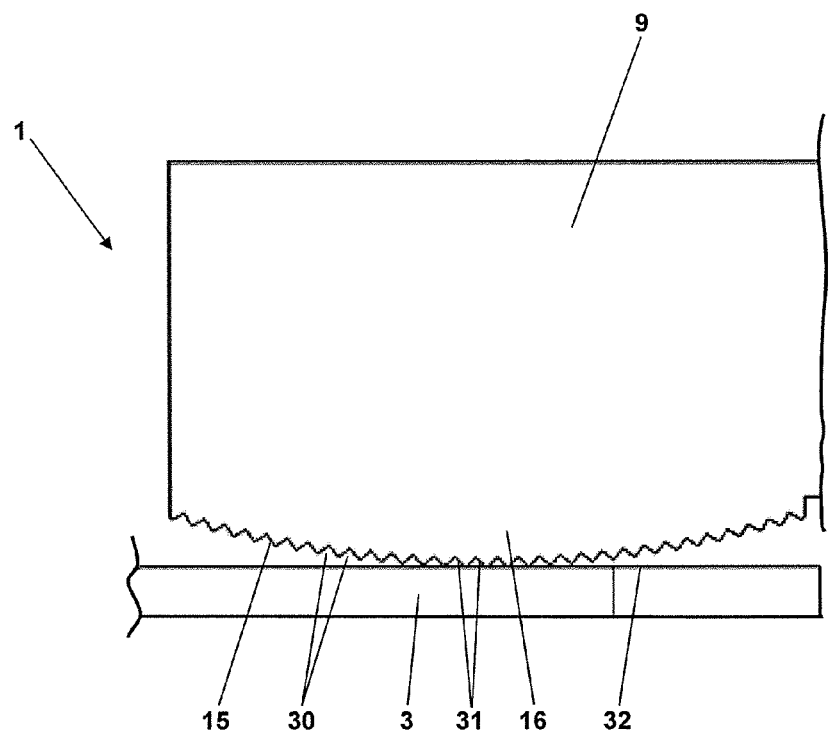
FIG. 6 is an enlarged view of a contact surface and of the conductor contacted by this contact surface of a second embodiment of the electrical connection between two busbars with a viewing direction along the longitudinal edges of the busbars.

In FIG. 6, a contact surface 15 of a contact element 9 of a second embodiment of the electrical connection 1 is depicted together with a conductor 3 contacted by this contact surface 15. In this embodiment of the electrical connection 1, all other contact surfaces 15, not depicted here, may have the same additional structure by means of grooves 30 in the contact surface 15. Areas 31 which are triangular-shaped or sawtooth-shaped in the depiction according to FIG. 6 remain between these grooves 30 and are pressed into the surface 32 of the conductor 3 by the contact force exerted onto the contact element 9, and thus break up any oxide layer at the surface 32 which may otherwise inhibit a low ohmic electrical contact between the conductor 3 and the contact element 9. The contact element 9 is made of a harder alloy than the conductor 3 so that the outwardly pointed areas 31 are in fact pressed into the surface 32 by means of the contact force applied but not deformed. For example, an aluminum alloy of the contact element 9 may be alloy-hardened by zinc. The grooves 30 and the clamping webs 16 in the contact area 15 of the contact element 9 may be made during rod extrusion of a basic body for the contact element 9. In principle, they may also be made afterwards. For example, the grooves 30 may be milled into the contact element 9 when forming the clamping web 16 at the contact element 9 by milling or afterwards.

Many variations and modifications may be made to the preferred embodiments of the disclosure without departing substantially from the spirit and principles of the disclosure. All such modifications and variations are intended to be included herein within the scope of the present disclosure, as defined by the following claims.

The invention claimed is:

1. An electrical connection apparatus, comprising:
   two busbars,
      wherein each busbar comprises two flat conductors and an insulating layer disposed between the two flat conductors,
      wherein each busbar has a longitudinal edge, and wherein the longitudinal edges of the two busbars are arranged opposite to each other, and
      wherein the two conductors of each busbar run parallel to each other at a distance along the longitudinal edge of the respective busbar,
   a shaped body comprising an insulating material bridging the distance between the two conductors of both the busbars;
   two electrically conductive contact elements forced against each other but electrically insulated from each other,
      wherein the shaped body and the conductors of both busbars on both sides of the shaped body are arranged between the two contact elements,
      wherein each contact element is configured to contact one conductor of each busbar via a structured contact surface and clamps the respective conductor against the shaped body, wherein the contact surfaces of the contact elements for each conductor of the two busbars comprise a clamping rib extending parallel to the longitudinal edges, and wherein the cross section of the clamping rib is trapezoid.

2. The electrical connection apparatus of claim 1, wherein the contact surface for each conductor has a radius of curvature which is in a range of 0.5 times to 5 times the width of the contact surface perpendicular to the longitudinal edges.

3. The electrical connection apparatus of claim 2, wherein each contact surface has a radius of curvature which is in a range of 1 time to 2 times the width of the contact surface perpendicular to the longitudinal edges.

4. The electrical connection apparatus of claim 1, wherein the shaped body comprises an electrically insulating material selected from thermoset and ceramic materials.

5. The electrical connection apparatus of claim 1, wherein the insulating layer disposed between the two conductors of each busbar extends up to between one of the conductors of the respective busbar and the shaped body.

6. The electrical connection apparatus of claim 1, wherein the shaped body comprises plane-parallel supporting surfaces for the conductors of the two busbars.

7. The electrical connection apparatus of claim 1, wherein the shaped body comprises convex supporting surfaces for the conductors of the two busbars.

8. The electrical connection apparatus of claim 1, wherein at least one of the two conductors of each busbar, at the longitudinal edge of the respective busbar, is offset away from the other conductor of the respective busbar.

9. The electrical connection apparatus of claim 1, wherein the contact elements, at the contact surfaces, comprise a higher surface hardness than the conductors of the busbars.

10. The electrical connection apparatus of claim 1, wherein the contact elements are made of a harder aluminum alloy than an aluminum alloy of the conductors 11. An electrical connection apparatus, comprising:
two busbars,
wherein each busbar comprises two flat conductors and an insulating layer disposed between the two flat conductors,
wherein each busbar has a longitudinal edge, and wherein the longitudinal edges of the two busbars are arranged opposite to each other, and
wherein the two conductors of each busbar run parallel to each other at a distance along the longitudinal edge of the respective busbar,
a shaped body comprising an insulating material bridging the distance between the two conductors of both the busbars; and
two electrically conductive contact elements forced against each other but electrically insulated from each other,
wherein the shaped body and the conductors of both busbars on both sides of the shaped body are arranged between the two contact elements,
wherein each contact element is configured to contact one conductor of each busbar via a structured contact surface and clamps the respective conductor against the shaped body, and
wherein the contact surfaces of the contact elements for each conductor of the two busbars comprise a clamping rib extending parallel to the longitudinal edges, and
wherein the contact elements are forced against each other by a plurality of clamping elements distributed along the longitudinal edges.

12. The electrical connection apparatus of claim 11, wherein the contact elements are forced against each other by at least three clamping elements.

13. The electrical connection apparatus of claim 11, wherein each clamping element comprises a clamping screw which, through a hole in one of the contact elements, engages a thread in the other one of the two contact elements.

14. The electrical connection apparatus of claim 13, wherein each thread is provided in a separate threaded bushing pressed into the other one contact element.

15. The electrical connection apparatus of claim 13, wherein each clamping screw is electrically insulated from the one of the two contact elements.

16. The electrical connection apparatus of claim 15, wherein each clamping screw is electrically insulated from the one of the two contact elements by a bushing comprising an electrically insulating material, wherein a head of the clamping screw abuts against the one of the contact elements via a radial flange of the bushing, and wherein the bushing extends into the shaped body.

17. The electrical connection apparatus of claim 16, wherein each bushing comprises an electrically insulating material selected from a thermoset material and a ceramic material.

18. An electrical connection apparatus, comprising:
two busbars,
wherein each busbar comprises two flat conductors and an insulating layer disposed between the two flat conductors,
wherein each busbar has a longitudinal edge, and wherein the longitudinal edges of the two busbars are arranged opposite to each other, and
wherein the two conductors of each busbar run parallel to each other at a distance along the longitudinal edge of the respective busbar,
a shaped body comprising an insulating material bridging the distance between the two conductors of both the busbars; and
two electrically conductive contact elements forced against each other but electrically insulated from each other,
wherein the shaped body and the conductors of both busbars on both sides of the shaped body are arranged between the two contact elements,
wherein each contact element is configured to contact one conductor of each busbar via a structured contact surface and clamps the respective conductor against the shaped body,
wherein the contact surfaces of the contact elements for each conductor of the two busbars comprise a clamping rib extending parallel to the longitudinal edges, and
wherein each contact surface for each one of the conductors of the two busbars is provided with grooves running parallel to the longitudinal edges and providing the contact surface with a structure selected from a triangular structure and a sawtooth structure.

19. The electrical connection apparatus of claim 18, wherein the grooves have widths and depths in a range of 0.1 mm to 1 mm.

20. The electrical connection apparatus of claim 19, wherein the grooves have widths and depths in a range of 0.1 mm to 0.5 mm.

* * * * *